United States Patent [19]
Griffin et al.

[11] Patent Number: 5,910,372
[45] Date of Patent: Jun. 8, 1999

[54] COATING

[75] Inventors: Mary Catherine Ambrose Griffin, Cambridge; Leslie George Howarth, Oxfordshire; John Philip Tatum, Isleham, all of United Kingdom

[73] Assignee: Xaar Technology Limited, Cambridge, United Kingdom

[21] Appl. No.: 08/808,244

[22] Filed: Feb. 28, 1997

Related U.S. Application Data

[63] Continuation of application No. PCT/GB95/02041, Aug. 30, 1995.

[30] Foreign Application Priority Data

Aug. 30, 1994 [GB] United Kingdom .................. 9417445

[51] Int. Cl.$^6$ ...................................................... B32B 5/14
[52] U.S. Cl. ........................... 428/429; 428/447; 428/450
[58] Field of Search .................................. 428/447, 450, 428/429

[56] References Cited

U.S. PATENT DOCUMENTS

| | | | |
|---|---|---|---|
| 5,041,588 | 8/1991 | Caporiccio | 556/413 |
| 5,266,222 | 11/1993 | Willis et al. | 252/49.006 |

FOREIGN PATENT DOCUMENTS

| | | |
|---|---|---|
| 0 195 292 | 9/1986 | European Pat. Off. . |
| 0 367 438 | 5/1990 | European Pat. Off. . |
| 0 477 805 | 4/1992 | European Pat. Off. . |
| 0 479 493 | 4/1992 | European Pat. Off. . |
| 0 497 204 | 8/1992 | European Pat. Off. . |
| 0 525 598 | 2/1993 | European Pat. Off. . |
| 0 571 896 | 12/1993 | European Pat. Off. . |
| 42 29 433 | 3/1994 | Germany . |

*Primary Examiner*—Erma Cameron
*Attorney, Agent, or Firm*—Marshall, O'Toole, Gerstein, Murray & Borun

[57] ABSTRACT

A coating on a substrate which endows the substrate with a desired surface property, the coating comprising a cross-linked polysiloxane containing X'— and X-groups attached to different Si atoms wherein the groups X'— are monovalent organic groups which provide the desired surface property and the groups X— are monovalent organic groups which are reactive with a group on the substrate surface and have a higher surface tension than the groups X'—, said coating being bonded to said substrate by reaction of X-groups with substrate surface groups reactive therewith. In one embodiment a non-wetting coating is provided wherein the X'— group has the formula $CF_3Z$— where Z is a divalent organic group or the formula $CH_3(CH_2)_t$ where t is at least 3.

50 Claims, No Drawings

COATING

This is a continuation of copending International Application Ser. No. PCT/GB95/02041 filed Aug. 30, 1995.

The present invention relates to providing a surface, such as a surface of the nozzle plate of an ink jet print head, with a layer having a predetermined surface property. While the invention is described hereinafter with particular reference to providing a surface with a non-wetting layer it is of more general application and may be employed to provide layers having other desired surface properties, if required.

In the manufacture of ink jet print heads, it is desirable for at least a part of the surface of the nozzle plate, and in particular a zone surrounding a nozzle orifice, to be resistant to wetting by the ink; otherwise the ink tends to form a pool round the orifice and this pool can interfere with the proper operation of the printer. The nozzle plate may be an integral part of the print head or a separate entity which is attached to the print head.

For a surface to be resistant to wetting by a liquid, its critical surface tension or "surface energy" as measured by the method by Zisman should be significantly less than that of the liquid. Many inks favoured for ink jet printing are based on solvents having relatively low surface energies, eg. 20 or 25 to 35 $mN.m^{-1}$, whereas the materials from which the print heads are formed, eg. polyesters, polyimides, glass, ceramics and metal, tend to have a higher surface energy, e.g. greater than 40 $mN.m^{-1}$. It is therefore necessary to provide those portions of the surface which are desired to be resistant to wetting by the ink with a suitable coating. For purposes of simplicity such coatings are referred to hereinafter as non-wetting coatings.

One class of coating material that is particularly favoured for its non-wetting properties comprises fluorinated organic compounds; however these are notoriously difficult to bond to many of the materials from which ink jet print heads are formed and there have been many proposals for solving the problem. One solution is provided by EP-A-0367438 which describes selecting a fluorinated organosilane as the non-wetting material and bonding it to the substrate surface by means of an interlayer comprising cured siloxane. While very good adhesion is achieved with the process, still further improvement is desired and it would also be desirable to simplify the coating procedure.

We have now discovered a method of providing a strongly bonded non-wetting coating based on organosilane which can be applied to a substrate in a single step. The invention also provides a coating composition, a method of forming the coating from the coating composition, and coated substrates.

U.S. Pat. No. 5,266,222 describes a formulation for forming a low surface-energy surface on a substrate, said formulation having (i) a fluoroalkyl silane having a low energy part and a substrate-chemically reactive part and (ii) a liquid crystal silane in (iii) a transport medium. The coating formed on the substrate surface is bonded to the surface by the substrate-chemically reactive part of the fluoroalkylsilane and the purpose of the liquid crystal silane is to enhance the orientation of the fluoroalkylsilane so that the substrate-chemically reactive part is nearest the surface of the substrate and the low energy part extends outwardly therefrom. Thus both the group which bonds the coating to the substrate and the group which provides the low energy surface are attached to the same silicon atom.

In its broadest aspect, the invention provides a coating on a substrate to endow said substrate with a desired surface property, said coating comprising a crosslinked copolysiloxane containing X'- and X-groups attached to different Si atoms wherein the groups X'- are monovalent organic groups which provide the desired surface property and the groups X- are monovalent organic groups which are reactive with a group on the substrate surface and have a higher surface tension than the groups X', said coating being bonded to said substrate by reaction of X-groups with substrate surface groups reactive therewith.

By group X having a higher surface tension than group X' we mean that a surface monolayer of X groups has a higher surface tension than a surface monolayer of X' groups.

As indicated above, the invention is particularly concerned with coating the nozzle plates of ink jet print heads, and especially providing a non-wetting coating.

In accordance with one embodiment of this aspect of the invention, there is provided a non-wetting crosslinked copolysiloxane coating on a substrate, said copolysiloxane containing $CF_3Z—$ and X-groups attached to different Si atoms wherein each Z is a divalent organic group and each X is a monovalent organic group reactive with a group on the coated substrate surface, sai& coating being bonded to said substrate by reaction of X-groups with substrate surface groups reactive therewith.

Thus, the copolysiloxane contains at least two different kinds of repeat units. The first comprises the monovalent organic group X', e.g. $CF_3Z—$, attached to a silicon atom which in turn is attached to at least one oxygen atom attached to another silicon atom in the copolysiloxane and the second comprises the monovalent organic group X attached to a silicon atom which in turn is attached to at least one oxygen atom attached to another silicon atom in the copolysiloxane; the X' and X groups being attached to different silicon atoms.

The crosslinked copolysiloxane coating may be formed by applying to a substrate a crosslinkable composition of silicon compounds including a silicon compound containing the group X' and a silicon compound containing the group X in an aqueous medium and causing or allowing the said silicon compounds to crosslink. The coating so formed exhibits excellent adhesion to the substrate and a surface which has the desired surface property provided by the group X'. Thus, where, for example, X' is $CF_3Z—$, a surface is provided which has excellent non-wetting properties even towards non-aqueous inks. While not wishing to be bound by this theory, it is believed that during the formation of the crosslinked polysiloxane from the crosslinkable composition of the silicon compounds, effective partition of the X' and X groups occurs whereby the silicon-containing molecules tend to orient themselves with X' groups tending to concentrate at the coating/atmosphere interface while the X groups tend to concentrate at the coating/substrate interface, e.g. as shown very diagrammatically below.

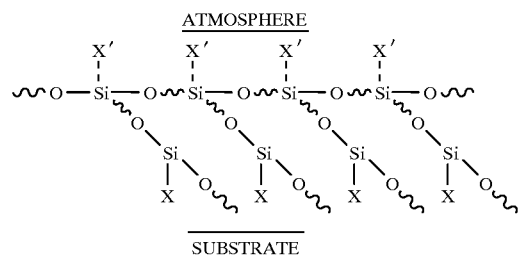

In the above diagram, it is to be understood that each can represent a direct or indirect link.

In any event, where X'=CF₃Z—, coatings have been obtained according to the invention wherein the surface energy, as defined by Zisman, is close to that which has been measured for a monolayer of close-packed CF₃-groups; moreover with appropriate choice of X dependent upon the nature of the substrate surface, the coatings are strongly bonded to the substrate as evidenced by resistance to abrasion. For example, where the substrate surface is polyimide, one appropriate choice for X is a group containing —NH₂. The surface energy of a close packed layer of —NH₂ groups will be significantly higher than that of a close packed layer of —CF₃ groups.

It is preferred that the silicon atoms carrying the X groups and the silicon atoms carrying the X' groups are in different siloxane layers of the coating. More preferably they are separated by one or more, and generally several, siloxane layers. The manner of achieving this preferred arrangement is described below.

Preferably, the crosslinked polysiloxane will also include other siloxane units in addition to those containing the groups X'— and X—, to enhance other desirable properties in the coating such as tensile strength, abrasion resistance, hardness and fracture toughness. Suitable units will be known to those skilled in the art but for reasons of cost and availability of the compounds from which they are derived, they will generally comprise silicon atoms to which groups selected from lower alkyl and alkoxy groups and phenyl groups, are attached. It is preferred that these silicon atoms form a major part of the crosslinked polysiloxane because of the relatively greater cost of silicon compounds containing the groups X'— and X—, especially where X'— is CF₃Z—. Suitably these silicon atoms form a major proportion of the total number of silicon atoms of the crosslinked polysiloxane and provide the backbone of the copolysiloxane to which the silicon atoms containing the X'— groups and the silicon atoms containing the X-groups are attached.

Thus in accordance with one preferred embodiment, the crosslinked copolysiloxane includes the following repeating units

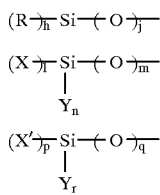

wherein
- each X is a monovalent organic group chosen to be reactive with a group on the substrate surface;
- each X' is a monovalent organic group chosen to provide the desired surface property;
- each R is hydrogen or a monovalent organic group which is non-reactive with groups on the substrate surface, is different from X' and does not adversely affect the formation of the desired surface property, or the formation of the copolysiloxane;
- each Y is hydrogen or a monovalent organic group which is non-reactive with groups on the substrate surface, is different from X' and does not adversely affect the formation of the desired surface property, or the formation of the copolysiloxane; h is 0, 1 or 2 and j is 4, 3 or 2, the total of h and j being 4; l is 1 or 2, m is 1, 2 or 3 and n is 0, 1 or 2, the total of l, m and n being 4; and p is 1 or 2, q is 1, 2 or 3 and r is 0, 1 or 2, the total of p, q and r being 4.

Preferably each R and each Y is selected from phenyl and lower alkyl and lower alkoxy groups e.g. having 1 to 3 carbon atoms, especially methyl, ethyl, methoxy and ethoxy.

So that the product is crosslinked, it will be understood that in at least some of the units, the Si atom must be attached to at least three —O— groups; that is to say in at least some of the units I, j is 3 and/or in at least some of the units II, m must be 3 and/or in at least some of the units III, q must be 3. Preferably, the crosslinking is provided mainly by providing units of the kind I wherein j is 3.

It will be understood that other units may also be included in the copolysiloxane, if desired, provided that they do not interfere unacceptably with the film-forming properties of the copolysiloxane, the bonding of the copolysiloxane to the substrate and the desired surface property of the coating. One example of such units is those having the structure I but wherein an R group is an ethylenically unsaturated group, e.g. vinyl or allyl.

The units of the structure II, and more specifically the groups X— thereof, provide the means whereby the copolysiloxane is bonded to the substrate. While in these units it is sufficient for m to be 1, so that the units are chemically bound to the body of the copolysiloxane, it is preferred that m is greater than 1, e.g. 2 or 3, to reduce the possibility of such units becoming detached from the body of the copolysiloxane by bond scission, thereby reducing the strength of the bond of the copolysiloxane to the substrate. For similar reasons, it is preferred that units of the structure II provide at least 0.1% of the total number silicon atoms in the copolysiloxane, and preferably from 0.1 to 10%, more preferably 0.4 to 3%. Above 10%, it is not expected that any further improvement in bond strength will be obtained and other desirable properties of the coating may be adversely affected.

The units of the Structure III provide the desired surface properties and for the same reasons as are given above for the units of structure II, while q may be 1, it is much preferred that it is 2 or 3, more preferably, 3. The number of silicon atoms in the copolysiloxane provided by units having the structure III will depend upon the nature of the group X' but in general will be at least that number that is just enough experimentally to provide a monolayer of the free end, i.e. terminal group or groups, of the X' group on the surface of the coating. In general, the units of the structure III will provide a minor proportion, usually no more than 20% of the silicon atoms in the copolysiloxane. In the particular case where X' is CF₃Z—, so as to provide a non-wetting coating, units of the structure III will preferably provide from 0.01% to 15%, more preferably from 0.1 to 5%, of the silicon atoms in the copolysiloxane. Above 15%, little further improvement is expected and other properties of the coating may be adversely affected.

The units of structure I are preferably chosen to provide the important physical properties of the coating and it is also preferred that the desired level of crosslinking is achieved largely by means of these units. Preferably, therefore, they provide a major part (i.e. over 50%), and more preferably at least 75%, of the silicon atoms of the copolysiloxane. The maximum proportion of these units in the copolysiloxane is generally controlled by the number of units II, units III and any optional units that are also present but in general units of structure I will not provide more than about 99.8%, and more preferably not more than about 99%, of the total number of silicon atoms.

The thickness of the coating can also be controlled by the number of units of the structure I present, the larger numbers producing the thicker coatings by increasing the number of intermediate siloxane layers in the copolysiloxane linking the upper layer containing units of structure III to the lower layer (that is, the layer adjacent the substrate) containing units of structure II. As indicated above, it is preferred that the silicon atoms containing the groups X are spaced from the silicon atoms containing the groups X' by at least one and preferably several intermediate siloxane layers. This improves the ability of the coating to smooth out irregularities in the substrate surface and thereby improve its non-wetting properties.

It will be understood that within the ranges of concentration given above for units of structure II and III, the actual concentration desired will depend upon the thickness of the coating and thus the number of intermediate siloxane layers. With increase in thickness, the number of units of structure I relative to the number of units of structures II and III will increase, and vice versa. In general it is desired to choose the amount of compound providing the units of structure I to achieve a coating thickness in the range 100 to 1000 millimicrons. Increase in the number of intermediate siloxane layers might also be expected to increase the partition of structures II and III.

In the units of the structure I, it will be understood that those wherein j is 3 will contribute to the crosslinking. Thus, physical properties of the coating may be varied by varying the ratio of units wherein j is 2, to the number of units where j is 3. Decreasing the ratio will increase the crosslink density and thus the rigidity and hardness of the coating while increasing the ratio will reduce crosslink density and introduce elastomeric properties. While, in general, satisfactory coatings are obtained at all ratios of units where j is 3 to units where j is 2, a preferred ratio of units where j is 3 to units where j is 2, is in the range 1:9 to 1:1 by volume. However, it is generally preferred that unit I contributes significantly to the desired level of crosslinking.

It will generally be preferred that in most, if not all of the units of structure I, j is not more than 3, because the non-wetting properties of the coating are adversely affected where j is 4 in a significant proportion of the units.

In the units of the structure II, X comprises a group which is reactive with a group on the substrate surface eg. to form π—π bonds, hydrogen bonds or ionic or covalent bonds and the nature of X will therefore be chosen according to the nature of the surface to be coated. For example, where the surface is oxidised metal or glass, X may contain a —COOH group or a group hydrolysable to a —COOH group; where the surface is polyester or polyimide, X may contain an active hydrogen atom or be a group hydrolysable to a group containing an active hydrogen atom. In another alternative, X may contain a polymerisable ethylenically unsaturated group, for example a vinyl group, e.g. to enable bonding of the coating to the substrate by grafting. However, in the preferred case where the surface is polyimide, polycarbonate, polyether ether ketone (PEEK) or linear polyester, the strongest bonds have been obtained when X contains at least one Zerewitinoff hydrogen atom attached to a nitrogen atom e.g. as in primary and secondary amino groups, imino groups, amide groups and monosubstituted amide groups. While l may be 2, it will generally be preferred that l is 1 because where more than one X-group is present, steric hindrance which interferes with the ability of X to bond with the substrate may occur. The units may also include one, or even two, Y groups. Examples are hydrogen, phenyl, $C_{1-3}$ alkyl, e.g. methyl or ethyl, and $C_{1-3}$ alkoxy such as methoxy or ethoxy. However, as indicated above m is preferably 2 or 3 and for best results, it is preferred that l is 1 and m is 3, in which case it will be understood that the units II will contribute to the crosslinking.

Examples of X groups having a Zerewitinoff hydrogen atom attached to a nitrogen atom are groups having the structure

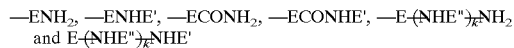

where E and E" are each alkylene having at least 2 carbon atoms, e.g. ethylene or propylene, E' is alkyl e.g. having 1 to 6 carbon atoms, preferably methyl, ethyl or propyl, and k is a whole number e.g. 1, 2 or 3 or more.

Specific examples are

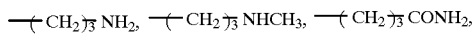

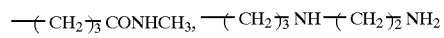

and

As stated above the nature of X' in structure III dictates the surface property provided by the layer and in one preferred embodiment, for the provision of non-wetting properties, even towards non-aqueous inks, X' is $CF_3Z$— where Z is a divalent organic group. For enhanced stability, particularly as elevated temperatures, Z includes the group —$CH_2CH_2$— by which it is attached to the Si atom. In this embodiment, preferably X' has the structure

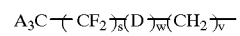

where each A is F or $CF_3$, D is a divalent atom or group, s is zero or a whole number, v is at least 2 and w is zero or one. D may be, for example, —$CF_2$—, —$CH_2$—, —O—, —S—, —$SO_2$—, —CHQ—, —$C(Q)_2$, —NH—, —NQ— or —CFH— where Q is a monovalent hydrocarbon group e.g. containing 1 to 6 carbon atoms.

Particular examples of this embodiment of X' have the structure $CF_3$—$(CF_2)_s$ $CH_2$—$CH_2$— where s is from 0 to 12, especially 0 to 9, more especially 0, 3, 5, 7 or 9.

It has also been found however that non-wetting surfaces may also be obtained wherein one or more of the fluorine atoms in the group $CF_3Z$- have been replaced by hydrogen atoms.

In particular, it has been found that non-wetting surfaces are obtainable where X' has the structure $CH_3(CH_2)_t$ where t is at least 3, e.g. 3 to 11. A particular example is $CH_3(CH_2)_2$—.

Preferably p is 1 because steric hindrance may interfere with the desired surface properties of the coating if p is greater than 1. However, valuable results have been obtained when p is 2. The units may also include one or even two Y groups. Examples of Y are as given above for structure II. As indicated above q is preferably 2 and more preferably 3.

The coatings of the invention are formed from film-forming compositions comprising at least one hydrolysable silicon compound containing at least one X'-group and at least one hydrolysable silicon compound containing at least one X-group. In general, the composition will also include a hydrolysable silicon compound known to form polysiloxane films.

The silicon compounds are preferably provided in the composition as a solution in a suitable solvent which is preferably readily removable from the coating, eg. by evaporation, and is of low surface tension. Suitable solvents are alcohols eg. ethyl alcohol. Preferably, the solution also includes a higher boiling component to promote self-levelling of the coating. Examples include alkanes, alkanols, ketones, esters, and ethers, e.g. hexane, butanol, n-hexanol, 2-butoxyethanol, butyl glycol, ethyl glycol acetate, cyclohexanone, propylene glycol monomethyl ether and dipropylene glycol monomethyl ether.

To enable the silicon components to hydrolyse, the coating composition will also contain water. While it is preferred that sufficient water should be included to permit complete hydrolysis of the hydrolysable silicon compounds, satisfactory results have also been achieved where a less than stoichiometric amount of water to effect hydrolysis of all the hydrolysable groups in the composition, e.g. as little as 50% of the stoichiometric amount, is employed. However, if too much water is present, the resultant solution, after hydrolysis of the silicon compounds, may not adequately wet the surface of the substrate to be coated, especially where this is formed of certain synthetic polymers. For example, where the surface is polyimide, it has been found that the water content of the composition prior to hydrolysis of the silicon compounds should preferably be not more than 350% of that required for the total hydrolysis.

In a preferred embodiment, the coating composition comprises (i) at least one film-forming silicon compound A selected from those having the structure $Si(R")_4$, $RSi(R")_3$ and $(R)_2Si(R")_2$ where each R is as defined above and R" is a hydrolysable group;

(ii) at least one silicon compound B having the structure $X_lSiY_nR"_m$ where X, Y, l, n and m are each as defined above and each R" is a hydrolysable group; and (iii) at least one silicon compound C having the structure $X'_pSiY_rR"_q$ where X', Y, p, q and r are each as defined above and each R" is a hydrolysable group;

and wherein at least some of the molecules contain at least three hydrolysable groups whereby to achieve crosslinking.

referred hydrolysable groups are alkoxy and chloride groups.

It will be understood that compounds A will provide units of structure I in the crosslinked copolysiloxane. In the preferred case where crosslinking is provided mainly by units of the structure I, it will be understood that at least some of the molecules of compound A will be of the structure $Si(R")_4$ or, more preferably, $RSi(R")_3$.

It is possible that not all of the hydrolysable groups of the compounds in the coating composition will be hydrolysed. Thus, for example, a compound A having the structure $RSi(R")_3$ may give rise to units in the crosslinked copolysiloxane having not only the structure

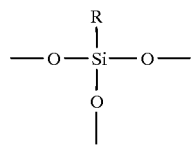

but also the units having the structure

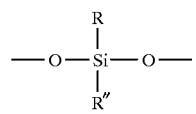

and even

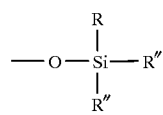

Compound A is preferably a compound which on hydrolysis and cross-linking will provide a strong hard film able to withstand temperatures of at least 100° C. without deteriorating. Particular examples of A are methyltriethoxysilane and tetraethoxysilane. Partially polymerised materials such as polydialkyl- and polydialkoxy-silanes may also be used as, or as part of, component A provided that they can be provided as emulsions or, more preferably, solutions in a solvent for the other components of the composition.

However, it has been found that improvements in one or both of non-wetting property and resistance of the coating of abrasion may be achieved where A comprises a mixture of compounds having the structure $RSi(R")_3$ and compounds having the structure $(R)_2Si(R")_2$, preferably where the ratio of the former to the latter is in the range 1:9 to 1:1, by volume. Examples of compounds having the structure $(R)_2Si(R")_3$ are dimethyldiethoxysilane dimethyldimethoxysilane, diethyldimethoxysilane and diethyldiethoxysilane. Other examples are corresponding compounds where one or both of the alkoxy groups are replaced by chlorine atoms.

While compound B in principle requires only one hydrolysable group R", it is preferred that it contains at least two and preferably three such groups and only one group X. Where it contains two hydrolysable groups, it may contain two X groups or one X group and one Y group. Particular examples are 3-aminopropyl triethoxysilane, trimethoxysilylpropyl substituted polyethyleneimine, dimethoxy methyl silyl propyl substituted polyethylene imine, N [3-(trimethoxysilyl)-propyl]ethylene diamine, N [3-(trimethoxysilyl)propyl]diethylene diamine, and carboxyamide silanes such as those sold as Prosil 9214 and Prosil 9215 by Fluorochem Ltd of Old Glossop, Derbyshire, England.

Compound C preferably contains at least 2, and preferably 3, hydrolysable groups R". Specific examples where X' is $CF_3Z$— are 1H,1H,2H,2H perfluorooctyl triethoxy- and trimethoxy-silanes, the corresponding compounds of 1H,1H,2H,2H perfluorodecyl, 1H,1H,2H,2H perfluoroundecyl and 3,3,3-trifluoropropyl, the corresponding compounds where one or two of the alkoxy groups are replaced by $C_{1-3}$ alkyl groups e.g. methyl and compounds wherein the hydrolysable atom or group is chlorine, e.g. 1H,1H,2H,2H perfluorooctyl dimethyl chlorosilane and the corresponding methyl dichlorosilane. Mixtures of 1H,1H,2H,2H perfluoroalkyl compounds having 8, 10 and 12 carbon atoms in the alkyl chain may also be used.

Examples of other hydrolysable silicon compounds that may be included, e.g. to provide in the crosslinked copolysiloxane coating further units in addition to those having the structures I, II and III are suitable vinyl silanes e.g. vinyltrimethoxy silane and vinyl triethoxy silane.

Hydrolysis of the silicon compounds of the coating composition and subsequent cross-linking may be promoted by acid or basic conditions. It is therefore preferred that the coating composition also include an additive which shifts the pH of the composition above or below 7. Where the group X of component B is basic, it is preferred that the additive is an acid which will promote protonation of X since this is believed to promote the partition of the X and the X' groups, at least in the case where X' is $CQ_3Z$—. Examples of suitable acids are mineral acids such as hydrochloric and organic acids such as acetic. The amount of acid employed is not believed to be critical provided that it is sufficient to neutralise all of any base present and ensure acidic conditions. Mixtures of acids may be used e.g. as in mixtures of hydrochloric and acetic. Preferably the acid is provided as a less than 1M solution.

The composition should be formed under clearly acid or basic conditions and therefore it is preferred to add the hydrolysable silicon compounds to an acidic (or basic) solution.

If desired one or more of the hydrolysable silicon compounds of the coating composition may be at least partially hydrolysed prior to inclusion in the composition. In the case where all the silicon compounds are completely hydrolysed prior to forming the composition, it will not be necessary for the composition to include water, or to include an acid or base.

Where the coating composition is incompletely hydrolysed, it may be desirable to age it prior to application to the substrate to form the coating to advance the hydrolysis of the hydrolysable groups. It is particularly important that compound A be at least partially hydrolysed and it is desirable that compounds B and C are also at least partially hydrolysed so as to reduce the possibility of evaporation of A, B and/or C during the curing required to effect the formation of the crosslinked film. This ageing also improves the mechanical properties of the resulting coating. The ageing may suitably be achieved by allowing the composition to stand at room temperature for several hours. The ageing process might also be accelerated by heat but care must be taken not to induce premature crosslinking leading to the formation of insolubles. The presence of such insolubles will be seen as the formation of cloudiness in the composition. In general, ageing for 1–2 days at room temperature has been found satisfactory although the use of longer periods may improve the non-wetting properties. If the ageing step is omitted, the coating may suffer from pinholes or other defects and this is believed to be due to the presence of excess water in the composition which has not been consumed in the hydrolysis. The addition of fluoride ion has been found to accelerate the ageing process substantially. Particularly preferred are alkali metal and quaternary ammonium fluorides such as tetrabutyl ammonium fluoride, and hydrogen fluoride.

The at least partially hydrolysed composition may then be applied to the substrate and cured to effect or complete crosslinking. While the substrate may consist of any suitable material whose surface is required to be made non-wetting, the invention is particularly applicable to the treatment of nozzle plates of ink jet print heads. The treatment may be effected before or after the formation of the nozzle plate from a blank. Thus, materials to which the coating may be applied include, in particular, metals (including metals whose surface has been oxidised by atmospheric oxygen), glass, ceramics and, especially, synthetic plastics. The invention is particularly applicable to laser-ablatable synthetic plastics such as polyimides, polycarbonates, saturated polyesters eg. polyethylene terephthalate and polybutylene naphthenate, and polyether ether ketones.

Where it is desired that the coating itself is laser-ablatable, it may be desirable to include a uv absorber such as ethyl cinnamate in the composition to improve its ablatability. Examples of suitable materials are ethyl trans-cinnamate, acridine and acridine hydrochloride. A suitable concentration of the absorber may be determined by simple experiment.

Prior to coating, it is preferred that the surface be pre-treated to clean it and, preferably, also increase its surface energy since this has been found to improve adhesion, especially of polyimide surfaces. One preferred pre-treatment for polyimides is to soak the surface in an aqueous alkaline solution, eg,. for about an hour, rinse with water, preferably deionised water, and then dry. The coating may then be applied in any suitable manner eg. roller coating, doctor knife coating or spraying. One preferred method is by meter bar whereby the composition is spread over the surface by means of a wire-wound bar. Preferably, the coating is applied as soon as possible after completion of the pre-treatment. The preferred wet coating thickness is 2 to 10 microns. At thicknesses below 2 microns, the coating may be incomplete and no apparent additional benefit is obtained from coatings more than 10 microns thick. Excessive thickness is preferably avoided if the coating is subsequently to be treated, e.g. by laser ablation, to remove some of it. A preferred dry thickness is 0.1 to 1 microns.

The coating is then caused or allowed to cure. Suitably, the cure is accelerated by application of heat and heating may conventionally be effected in an oven at a temperature which will depend upon the choice of the components for the composition but will generally be in the range 60° C. to 100° C., preferably about 70 to 95° C. To ensure completion of the formation of the cross-linked film, cure times of several hours, eg. 3 to 24 hours are recommended. Cure may be enhanced if it is effected in an atmosphere of high humidity.

Preferably, the coating is aged prior to the heating step, e.g. by allowing it to stand at room temperature for a few minutes e.g. 5 to 30 minutes, since this has been found to improve the properties of the resultant film, and in particular its surface properties and the strength of bond to the substrate. It is believed that this is because the ageing permits partition or "self assembly" of the molecules whereby those carrying the group X— concentrate at the coating/substrate interface while those carrying the group X'— concentrate at the interface of the coating with the atmosphere. It is believed that such self assembly is also assisted by including the relatively non-volatile solvent referred to above.

By means of the invention, coatings are obtainable which are strongly bonded to the substrate and provide the desired surface properties. In particular, non-wetting coatings may be obtained which exhibit excellent non-wetting characteristics to a range of ink jet ink compositions including those based on low surface energy solvents such as alkylene glycols, polyalkylene glycols and ethers thereof, hydrocarbons and mixtures thereof. The required surface energy ($mN.m^{-1}$) of the coating to provide the desired non-wettability will depend upon the nature of the ink but in general will be less than 20 and preferably less than 10 for non-aqueous inks, and less than 45 and preferably less than 35 for aqueous inks. By means of the invention, coatings have surface energies as low as 6 $mN.m^{-1}$ can be obtained.

One method of evaluating the non-wetting property of a surface relative to a particular liquid is to determine the receding meniscus velocity (RMV) of the liquid on the surface by the method described in Example 1.

In general, the higher the value for RMV, the better the non-wetting property of that surface and we have found it desirable for the RMV of the nozzle plate of an ink jet printer, relative to the ink employed, to be at least 1.0 mm.sec$^{-1}$. By means of the invention RMV values as high as 5 and even higher, up to 8 or more, can be obtained relative to inks having a surface tension of 25 mN.m$^{-1}$ and lower.

By means of the invention, moreover, coatings can be provided which are thermally stable up to temperatures as high as 200° C., resistant to abrasion and resistant to damage as a result of exposure to pre- and post-ablation treatments such as cleansing with solvents such as acetone and propan-2-ol. A particularly important feature of the coatings where X— is CF$_3$Z— or CH$_3$—(CH$_2$)$_t$— where t is at least 3 is their inertness to inks and their substantial freedom from defects.

The invention is now illustrated but in no way limited by the following Examples in which all parts are expressed by volume except where indicated otherwise. The surface energies of the coatings obtained were found to lie generally in the range 6–20 mN.m$^{-1}$.

EXAMPLE 1

A coating composition was prepared from the following components by first mixing the solvents and acids and then adding the silicon compounds

| | | |
|---|---|---|
| ethanol | 30 | parts |
| glacial acetic acid | 0.9 | part |
| hexanol | 2.0 | parts |
| hydrochloric acid (0.01 mol/dm$^3$) | 5 | parts |
| methyl triethoxysilane (MTES) | 5 | parts |
| 3-aminopropyl triethoxysilane (APTES) | 0.5 | part |
| 1H,1H,2H,2H perfluorooctyl triethoxysilane (PFOTES) | 0.5 | part. |

The solution so formed was then allowed to stand for 2 days to allow hydrolysis of the silicon compounds.

A sheet of polyimide is washed with about 1 mol/dm$^3$ NaOH, rinsed well with deionised water and dried by wiping with a clean room wipe and then the aged solution is applied to the surface of the sheet using a meter bar to form a wet coating approximately 4 microns thick. The coated sheet is allowed to stand for 5 minutes and then placed in a humid atmosphere in an oven at 95° C. for 3 hours. The resulting coating thickness was of the order of 0.6 microns.

An ink jet print head nozzle plate was then formed from the coated sheet by laser ablation.

The non-wetting property of the nozzle plate material was evaluated by measuring its receding meniscus velocity (RMV) in the following manner. A foam pad which has been soaked in a liquid is drawn across the non-wetting coating surface at a measured velocity. The velocity at which the liquid just fails to follow the foam pad and begins to leave a trail of liquid upon the non-wetting coating is taken to be the RMV. The liquid employed in the test was an ink jet printer ink comprising a colloidal dispersion of carbon black in tripropylene glycol monomethyl ether containing a polymeric dispersant and having a surface tension of about 30 mN.m$^{-1}$. The measured RMV was 2.7 mm sec$^{-1}$. The RMV was still greater than 1.0 mm sec$^{-1}$ after six weeks' immersion in the ink, indicating a very low level of interaction between the ink and the coating. By way of comparison, prior coatings tended to turn grey after a similar immersion treatment due to adhesion of components of the ink to the coating.

In a further test, the coated nozzle plate was wiped 50 times with a cotton bud soaked in acetone. No visible damage was perceived.

In another test, the abrasion resistance of the coated nozzle plate was evaluated by rubbing it with a foam pad soaked in ink. The coating survived 1,100 wipes before any loss of non-wetting properties was observed. Examination showed that the loss of performance was due to scratching and not as a result of attack by or absorbance of the ink.

The coating remained non-wetting after heating to 200° C. and was still effective after the equivalent of more than 3 months continuous use of a printer fitted with the coated nozzle plate.

COMPARATIVE EXAMPLE 2

A sheet of polyimide was pre-treated with NaOH, washed and dried as in Example 1 and then roll coated with a first composition comprising 5 ml MTES, 5 ml ethanol, 5 ml 0.1M HCl, 0.25 ml glacial acetic acid, 2 ml hexanol and 2.5 ml APTES in the manner described in step A of the Example of EP-A-0367438. The treated polyimide sheet was then roll-coated in a second step with a second composition having the same formulation as the first but excluding the APTES. Finally, the coated product was roll-coated with PFOTES and the coated product was dried and then baked under 95% relative humidity.

The non-wetting property and abrasion resistance of the coating so obtained were measured as described in Example 1 with the following results

| | |
|---|---|
| RMV | 0.7 mm sec$^{-1}$ |
| Rub life (foam pad soaked in ink) | 200 wipes |

It will thus be seen that not only is the coating of the present invention easier to apply but it provides an improvement both in non-wetting property and in abrasion resistance.

EXAMPLES 3–7

Using the method described in Example 1, a number of coatings were formed on a polimide substrate using the coating composition described in Example 1 but wherein varying amounts of the MTES were replaced by dimethyldiethoxysilane (DMDES). The results are set out in the Table below

| Examples | MTES (parts) | DMDES (parts) | HCl (0.01 mol/dm$^3$) (parts) | RMV (mm.sec$^{-1}$)* | Rub Life* |
|---|---|---|---|---|---|
| 1 | 5 | 0 | 5.0 | 1.9 | 700 |
| 3 | 4 | 1 | 4.8 | 2.7 | 3000 |
| 4 | 3 | 2 | 4.6 | 4.0 | n.m. |
| 5 | 2 | 3 | 4.5 | 6.4 | n.m. |
| 6 | 1 | 4 | 4.3 | 6.8 | n.m. |
| 7 | 0 | 5 | 4.1 | 5.1 | 1500 |

*In this and the subsequent Examples, the ink employed for measurements of RMV and Rub Life had the following formulation

| | | |
|---|---|---|
| Exxsol D140 | 59.55 | parts by weight |
| Novol | 17.75 | parts by weight |
| Dowanol TPM | 10.0 | parts by weight |
| Solsperse 13940 | 1.5 | parts by weight |
| Solsperse 5000 | 0.2 | parts by weight |
| Regal Black 250R | 11.0 | parts by weight. | and a surface tension of 25 mN/m.

Exxsol is a mixture of aliphatic hydrocarbons having a boiling range of 280 to 317° C. and marketed by Exxon; Novol is an oleyl alcohol marketed by Croda, Solsperse 13940 and Solsperse 5000 are dispersants marketed by Zeneca Colours and Regal Black 250R is a carbon black marketed by Cabot Carbon.

EXAMPLE 8

Using the method described in Example 1, a sheet of polyimide was coated with the formulation of Example 1 except that the PFOTES was replaced by the same volume of n-octyl triethoxysilane. The RMV was measured as 1.00 mm sec$^{-1}$ which, although less than that achieved using PFOTES, is still satisfactory.

EXAMPLES 9–11

These examples demonstrate the use of an alternative fluoroalkyl silane. Using the method described in Example 1, sheets of polyimide were coated with the formulations using 3,3,3-trifluoropropyl methyl dichlorosilane (TFPMDCS) in place of PFOTES.

The formulations of the coating compositions and the results obtained are set out in the Table below

| Example | 9 | 10 | 11 |
|---|---|---|---|
| Ethanol | 30 | 30 | 30 |
| HCl (0.01M) | 4.7 | 4.7 | 4.55 |
| acetic acid | 0.9 | 0.9 | 0.9 |
| hexanol | 2 | 2 | 2 |
| MTES | 4.9 | 4.875 | 4.5 |
| TFPMDCS | 0.1 | 0.125 | 0.5 |
| APTES | 0.5 | 0.5 | 0.5 |
| RMV (mm sec$^{-1}$) | 2.4 | 3.4 | 2 |

EXAMPLES 12–15

These Examples demonstrate the use of less than stoichiometric amounts of water. Using the method of Example 1, sheets of polyirnide were coated from the formulations shown in the Table below which also records the measured values for RMV.

| Example | 12 | 13 | 14 | 15 |
|---|---|---|---|---|
| Ethanol | 30 | 30 | 30 | 30 |
| HCl (0.03M) | 1.23 | 1.08 | 0.92 | 0.77 |
| acetic acid | 0.9 | 0.9 | 0.9 | 0.9 |
| hexanol | 2 | 2 | 2 | 2 |
| MTES | 5 | 5 | 5 | 5 |
| APTES | 0.5 | 0.5 | 0.5 | 0.5 |
| PFOTES | 0.5 | 0.5 | 0.5 | 0.5 |
| water stoichiometry | 80% | 70% | 60% | 50% |
| RMV (mm sec$^{-1}$) | 3.7 | 2 | 2.4 | 3 |

EXAMPLES 16–20

These examples demonstrate the effect of ageing the coating composition prior to coating. Each coating formulation comprised 4.28 parts 0.01M HCl, 0.9 part acetic acid, 2 parts hexanol, 1 part MTES, 4 parts DMDES, 0.5 part APTES and 0.5 part PFOTES. The results are set out in the Table below

| Example | 16 | 17 | 18 | 19 | 20* |
|---|---|---|---|---|---|
| Period of ageing solution | 2 days | 17 days | 44 days | 63 days | 40 mins. |
| RMV mm.sec$^{-1}$ | 2.3 | 6.8 | 6.43 | 8.2 | 8.8 |

*In this Example, the coating formulation included 0.4272 part of tetrabutyl ammonium fluoride.

EXAMPLE 21

A sheet of polyimide was coated in accordance with the method of Example 1 and with a composition comprising 30 parts ethanol, 1.5 parts 0.02M HCl, 0.9 part acetic acid, 2 parts hexanol, 5 parts MTES, 0.5 parts of an 85/15 molar mixture of bis(1H,1H,2H,2H perfluorooctyl) diethoxy silane and PFOTES. The measured RMV was 2.62 mm sec$^{-1}$.

EXAMPLE 22

A sheet of polyimide was coated by the method of Example 1 with the formulation of Example 1 but wherein the APTES was replaced by an equal volume of N-methylaminopropyl triethoxysilane. The measured RMV was about the same as that obtained using APTES.

EXAMPLE 23

This is an Example of forming a coating from a base-catalysed composition. A sheet of polyimide was coated by the method of Example 1 with the formulation of Example 1 but wherein the combination of acetic acid and hydrochloric acid was replaced by 0.944 part of ethanolamine. The measured RMV of the coating was found to be about the same as that of Example 1.

We claim:

1. A coating on a substrate to endow said substrate with a desired surface property, said coating comprising a crosslinked copolysiloxane containing X'-groups and X-groups attached to different Si atoms wherein the X'-groups are monovalent organic groups which provide the desired surface property and the X-groups are monovalent organic groups which are reactive with a group on the substrate surface and have a higher surface tension than the X'-groups, the silicon atoms carrying the X-groups and the silicon atoms containing the X'-groups being in different siloxane layers of the coating, which layers are separated by at least one further siloxane layer; said coating being bonded to said substrate by reaction of X-groups with substrate surface groups reactive therewith.

2. A coating as claimed in claim 1 wherein the siloxane layers carrying respectively the X-groups and the X'-groups are separated by more than one siloxane layer.

3. A coating as claimed in claim 1 and wherein each X'-group has the formula CF$_3$Z— where each Z is a divalent organic group.

4. A coating as claimed in claim 1 wherein said copolysiloxane comprises the following repeating units

Structure I

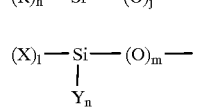

Structure II

-continued

Structure III

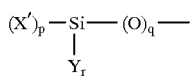

wherein
   each R is hydrogen or a monovalent organic group which is non-reactive with groups on the substrate surface, is different from X' and does not adversely affect the formation of the desired surface property, or the formation of the copolysiloxane;
   each Y is hydrogen or a monovalent organic group which is non-reactive with groups on the substrate surface, is different from X' and does not adversely affect the formation of the desired surface property, or the formation of the copolysiloxane;
   in each unit of structure I, h is 0, 1 or 2 and j is 4, 3 or 2, the total of h and j being 4; in each unit of structure II, l is 1 or 2, m is 1, 2 or 3 and n is 0, 1 or 2, the total of l, m and n being 4; and in each unit of structure III, p is 1 or 2, q is 1, 2 or 3 and r is 0, 1 or 2, the total of p, q and r being 4, wherein units of the structure I include units wherein j is 3 and units wherein j is 2, and the ratio of units wherein j=3 to units wherein j=2 is in the range 1:9 to 1:1 by volume.

5. A coating as claimed in claim 4 wherein the silicon atoms of structures I, II and III form from 75 to 99%, from 0.1 to 10% and from 0.01 to 15%, respectively, of the total number of silicon atoms in the copolysiloxane.

6. A coating as claimed in claim 1 having a thickness in the range 100 to 1000 millimicrons.

7. A coating as claimed in claim 3 wherein Z contains the group —CH$_2$—CH$_2$— and is attached to said Si atom by said group —CH$_2$—CH$_2$—.

8. A coating as claimed in claim 3 wherein in at least some of the CF$_3$Z- groups one or more of the fluorine atoms are replaced by hydrogen atoms.

9. A coating as claimed in claim 3 wherein some or all of the X'-groups are replaced by CH$_3$-groups.

10. A coating as claimed in claim 3 wherein said copolysiloxane comprises the following repeating units Structure I

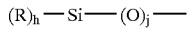

Structure II

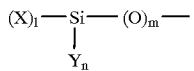

Structure III

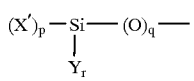

wherein
   each R is hydrogen or a monovalent organic group which is non-reactive with groups on the substrate surface, is different from X' and does not adversely affect the formation of the desired surface property, or the formulation of the copolysiloxane;
   each Y is hydrogen or a monovalent organic group which is non-reactive with groups on the substrate surface, is different from X' and does not adversely affect the formation of the desired surface property, or the formation of the copolysiloxane;
   h is 0, 1 or 2 and j is 4, 3 or 2, the total of h and j being 4; l is 1 or 2, m is 1, 2 or 3 and n is 0, 1 or 2, the total of l, m and n being 4; and p is 1 or 2, q is 1, 2 or 3 and r is 0, 1 or 2, the total of p, q and r being 4.

11. A coating as claimed in claim 10 containing units of the structure I wherein j is 3.

12. A coating as claimed in claim 10 wherein units of the structure I include units wherein j is 3 and units wherein j is 2.

13. A coating as claimed in claim 10 further including repeating units containing an ethylenically unsaturated group attached to an Si atom.

14. A coating as claimed in claim 10 wherein
   each X is selected from groups containing at least one Zerewitinoff hydrogen atom attached to a nitrogen atom;
   each R is hydrogen, phenyl or an alkyl or alkoxy group having from 1 to 3 carbon atoms;
   each Y is hydrogen, phenyl or an alkyl or alkoxy group having 1 to 3 carbon atoms;
   and each X' is a group having the structure CF$_3$Z— where Z is a divalent organic group.

15. A coating as claimed in claim 14 wherein each X' is selected from groups having the structure

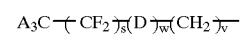

where each A is F or CF$_3$, D is a divalent atom or group, s is zero or a positive integer, v is at least 2 and w is zero or one.

16. A coating as claimed in claim 15 wherein X' is CF$_3$(CF$_2$)$_s$CH$_2$CH$_2$— where s is from 0 to 9.

17. A coating as claimed in claim 16 wherein X' is selected from the group consisting of

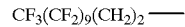
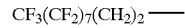
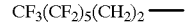
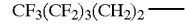
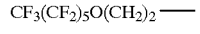

18. A coating as claimed in claim 10 wherein
   each X is selected from groups containing at least one Zerewitinoff hydrogen atom attached to a nitrogen atom;
   each R is hydrogen, phenyl or an alkyl or alkoxy group having from 1 to 3 carbon atoms;
   each Y is hydrogen, phenyl or an alkyl or alkoxy group having 1 to 3 carbon atoms;
   and each X' group includes the group CH$_3$(CH$_2$)$_t$—, where t is at least 3.

19. A coating as claimed in claim 18 wherein t is at least 5.

20. A coating as claimed in claim 14 wherein X contains a primary amine group.

21. A coating as claimed in claim 14 wherein l and p are each 1 and m and q are each 3.

22. A coating as claimed in claim 14 wherein the silicon atoms of unit I form at least 50% of the total number of silicon atoms in the copolysiloxane.

23. A coating as claimed in claim 14 wherein the silicon atoms of units I, II and III form from 75 to 99.1%, from 0.1 to 10% and from 0.01 to 15%, respectively, of the total number of silicon atoms in the copolysiloxane.

24. A coating as claimed in 3 on a substrate selected from ablatable synthetic polymers.

25. A coating as claimed in claim 24 wherein the ablatable synthetic polymer is selected from the group consisting of polyimide, polycarbonate, polyethylene terephthalate, polyether ether ketone and polybutylene naphthoate.

26. A coating as claimed in claim 3 on an ink jet printer nozzle plate.

27. A coating as claimed in claim 26 on a zone of the nozzle plate surrounding a nozzle.

28. A coating as claimed in claim 5 wherein the silicon atoms of structures II and III form from 0.4 to 3% and from 0.1 to 5%, respectively, of the total number of silicon atoms in the copolysiloxane.

29. A non-wetting coating on a substrate, said coating comprising a crosslinked copolysiloxane containing X'—groups and X-groups attached to different Si atoms wherein the X'-groups are monovalent organic groups having the structure $CF_3Z$— 29. where Z is a divalent organic group and the X-groups are monovalent organic groups containing at least one Zerewitinoff hydrogen atom attached to a nitrogen atom, the silicon atoms carrying the X-groups and the silicon atoms containing the X'-groups being in different siloxane layers of the coating, which layers are separated by at least one further siloxane layer; said coating being bonded to said substrate by reaction of X-groups with substrate surface groups reactive therewith.

30. A coating as claimed in claim 29 wherein the siloxane layers carrying respectively the X-groups and the X'-groups are separated by more than one siloxane layer.

31. A coating as claimed in claim 29 wherein Z contains the group —$CH_2$—$CH_2$— and is attached to said Si atom by said group —$CH_2$—$CH_2$—.

32. A coating as claimed in claim 29 wherein in at least some of the $CF_3Z$— groups one or more of the fluorine atoms are replaced by hydrogen atoms.

33. A coating as claimed in claim 29 wherein each X' group is selected from groups having the structure

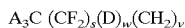

where each A is F or $CF_3$, D is a divalent atom or group, s is zero or a positive integer, v is at least 2, and w is zero or one.

34. A coating as claimed in claim 34 wherein X' is $CF_3(CF_2)_sCH_2CH_2$— where s is from 0 to 9.

35. A coating as claimed in claim 34 wherein X' is selected from the group consisting of

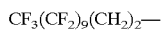

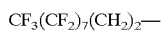

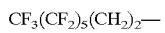

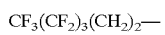

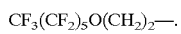

36. A coating as claimed in claim 29 wherein X contains a primary amine group.

37. A coating as claimed in claim 29 wherein said copolysiloxane comprises the following repeating units Structure I

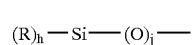

-continued

Structure II

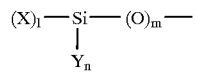

Structure III

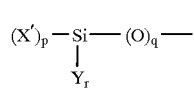

wherein
each X' group is a monovalent organic group having the structure $CF_3Z$— where Z is a divalent organic group;
each X group is a monovalent organic group containing at least one Zerewitinoff hydrogen atom attached to a nitrogen atom;
each R is hydrogen or a monovalent organic group which is non-reactive with groups on the substrate surface, is different from X' and does not adversely affect the formation of the desired surface property, or the formulation of the copolysiloxane;
each Y is hydrogen or a monovalent organic group which is non-reactive with groups on the substrate surface, is different from X' and does not adversely affect the formation of the desired surface property, or the formation of the copolysiloxane;
h is 0, 1, or 2 and j is 4, 3, or 2, the total of h and j being 4; l is 1 or 2, m is 1, 2, or 3 and n is 0, 1, or 2, the total of l, m and n being 4; and p is 1 or 2, q is 1, 2, or 3 and r is 0, 1, or 2, the total of p, q, and r being 4.

38. A coating as claimed in claim 37 containing units of the structure I wherein j is 3.

39. A coating as claimed in claim 37 wherein units of the structure I include units wherein j is 3 and units wherein j is 2.

40. A coating as claimed in claim 39 wherein the ratio of units wherein j is 3 to units wherein j is 2 is in the range 1:9 to 1:1 by volume.

41. A coating as claimed in claimed 37 wherein l and p are each 1 and m and q are each 3.

42. A coating as claimed in claim 37 further including repeating units containing an ethylenically unsaturated group attached to an Si atom.

43. A coating as claimed in claim 37 wherein the silicon atoms of structure I form at least 50% of the total number of silicon atoms in the copolysiloxane.

44. A coating as claimed in claim 37 wherein the silicon atoms of structures I, II, and III form from 75% to 99.1%, from 0.1% to 10%, and from 0.01% to 15%, respectively, of the total number of silicon atoms in the copolysiloxane.

45. A coating as claimed in claim 44 wherein the silicon atoms of structures II and III form from 0.4% to 3% and from 0.1% to 5%, respectively, of the total number of silicon atoms in the copolysiloxane.

46. A coating as claimed in claim 29 on a substrate selected from ablatable synthetic polymers.

47. A coating as claimed in claim 46 wherein the ablatable synthetic polymer is selected from polyimide, polycarbonate, polyethylene terephthalate, polyether ether ketone, and polybutylene naphthoate.

48. A coating as claimed in claim 29 on an ink jet printer nozzle plate.

49. A coating as claimed in claim 48 on a zone of the nozzle plate surrounding a nozzle.

50. A coating as claimed in claim 46 having a thickness in the range 100 millimicrons to 1,000 millimicrons.

* * * * *